United States Patent [19]

Nientiedt et al.

[11] Patent Number: 4,774,155
[45] Date of Patent: Sep. 27, 1988

[54] HERMETICALLY SEALED GALVANIC CELL

[75] Inventors: Heinz-Werner Nientiedt, Ellwangen; Josef Sekler, Ellwangen-Rattstatt, both of Fed. Rep. of Germany

[73] Assignee: Varta Batterie Aktiengesellschaft, Hanover, Fed. Rep. of Germany

[21] Appl. No.: 125,172

[22] Filed: Nov. 25, 1987

[30] Foreign Application Priority Data

Feb. 13, 1987 [DE] Fed. Rep. of Germany ....... 3704536

[51] Int. Cl.$^4$ .............................................. H01M 2/12
[52] U.S. Cl. ........................................................ 429/56
[58] Field of Search ..................................... 429/56, 53

[56] References Cited

U.S. PATENT DOCUMENTS

| 2,478,798 | 8/1949 | Williams | 429/56 |
| 4,476,200 | 10/1984 | Markin et al. | 429/56 |
| 4,529,673 | 7/1985 | Zupancic | 429/56 |
| 4,537,841 | 8/1985 | Wiacek et al. | 429/56 |

Primary Examiner—Donald L. Walton
Attorney, Agent, or Firm—Weiser & Stapler

[57] ABSTRACT

A plastic sealing member for sealing the housing cup of a round-type galvanic cell, and which is provided with a predetermined breaking point (bursting membrane or score) to prevent explosion of the cell during improper use, is covered on the surface which faces the inside of the cell with a pore-free film of bitumen, a synthetic resin, an adhesive, or a lacquer, at least over the predetermined breaking point and its immediate vicinity, to inhibit stress corrosion cracking which propagates under high mechanical stress and under the effect of the alkaline electrolyte, without reducing the intended bursting pressure.

9 Claims, 1 Drawing Sheet

HERMETICALLY SEALED GALVANIC CELL

BACKGROUND OF THE INVENTION

The present invention pertains to a galvanic cell having a negative zinc electrode, an alkaline electrolyte, and a housing which is sealed by a sealing member made of plastic and having a predetermined breaking point in the form of a bursting membrane or a score.

The present invention generally relates to cells of the alkaline-manganese type having a housing in the form of a round cell. The housing of this cell is preferably formed as a steel cup for receiving the electrode materials, and is sealed in liquid-proof manner by a plastic seal. The steel cup acts as the positive terminal and cell pole.

To protect against explosion of such a cell, which may occur as the result of unacceptably high internal pressures due to overheating of the cell, or due to incorrect connection of the cell poles, the cell's plastic seal is advantageously provided with predetermined breaking points. To this end, points of reduced strength are provided which can withstand normal operating pressures, but which can assure the release of excess pressures from the cell by breaking down before the cell's internal pressure reaches an uncontrollably high value.

Predetermined breaking points in plastic seals are usually formed by greatly reducing the thickness of the material in a desired area. As an example of this, the sealing member described in U.S. Pat. No. 4,476,200 includes a bursting membrane to develop the desired predetermined breaking point. However, the predetermined breaking point may also be developed as part of the cell's disk-shaped sealing member, by providing the sealing member with a region having a smaller wall thickness than its surroundings and which is separated from its surroundings by a circular score or rupture line of reduced material thickness.

Care must be taken to assure that the integrity of the plastic seal is not jeopardized by the predetermined breaking point. Its chemical resistance to attack by the electrolyte must be ensured. Its stability in terms of shape, which is needed to maintain internal pressure, must not be allowed to decrease. The rate of permeation for oxygen, water and electrolyte must be maintained low.

Insofar as it was possible to take these fundamental requirements into account, of the available materials, polyamide proved to be especially suitable for use with zinc-manganese dioxide cells as compared to other thermoplastics such as polyethylene, polypropylene, polyethylene-polypropylene copolymers, polyphenylene oxide or acrylonitrile-butadiene-styrene terpolymer because polyamide is characterized by high dimensional stability and satisfactory resistance to chemicals. Because of these properties, seals based on polyamide have also proven to be especially highly successful in connection with the manufacture of round cells.

However, practical experience has shown that the bursting pressure drops to only a fraction (about 1/10) of its original value in the case of polyamide seals provided with bursting membranes if the seal is simultaneously exposed to alcaline electrolyte and elevated temperature. This reduction, which leads to a premature response of the bursting membrane, was found to result from stress corrosion cracking which develops under the effect of the electrolyte.

SUMMARY OF THE INVENTION

It is therefore an object of the present invention to provide a sealing member with a predetermined breaking point, and which is resistant to premature bursting, even in the presence of alcaline electrolyte and elevated temperature.

It is also an object of the present invention to provide a sealing member with a predetermined breaking point, and which is resistant to stress corrosion cracking under the effect of the electrolyte.

These and other objects are achieved according to the present invention by providing a galvanic cell having a negative zinc electrode and an alkaline electrolyte with a sealing member made from plastic and having a predetermined breaking point in the form of a bursting membrane or a score, and which is provided with an essentially pore-free, film-like cover layer which is resistant to the electrolyte at least in the area of the predetermined breaking point.

Further discussion regarding the improved galvanic cell of the present invention is provided with reference to the detailed description which is provided below, taken in connection with the following illustrations.

BRIEF DESCRIPTION OF THE DRAWINGS

In the views provided, like reference numerals denote similar structure.

DETAILED DESCRIPTION OF PREFERRED EMBODIMENTS

In accordance with the present invention, the mechanical strength of the predetermined breaking point (bursting membrane or score) is ensured to a certain extent, even under unusual operating conditions of the cell, if at least the predetermined breaking point is fully covered by applying a coating material to the bottom side of the seal facing the electrolyte so that the bottom side of the seal cannot be wetted by the alkali. If desired, it is particularly advantageous (for technological reasons) to coat the sealing member on both sides. Thus sheltered from the corrosive attack of the alkaline electrolyte, the predetermined breaking point is now able to withstand a critical tensile stress, even at elevated temperatures, with unchanged mechanical load-bearing capacity. The bursting pressure remains constant.

Suitable for use as coating materials are bitumen and paraffin; various synthetic resins such as vinyl compounds, polycarbonates, polystyrene and acrylonitrile; adhesives such as fatty acid polyamides, polyisobutylene pressure-sensitive masses, cold-curing cyanoacrylates, and melt-adhesives based on polyamides; and alkali-resistant lacquers.

Prerequisites for the material selected in accordance with the present invention include good adhesion of the coating material to the sealing member; good coverage of the critical area by the coating; sufficient electrolyte resistance of the coating material, at least during the life of the cell; and the absence of appreciable effects on the mechanical properties of any portions of the sealing member which may not be covered and are therefore accessible to the electrolyte.

With the assistance of the protective layer which is provided in accordance with the present invention on the surface of the sealing member which faces the electrolyte, the three above-mentioned requirements for galvanic cells of the present type, i.e., chemical resistance, dimensional (shape) stability and low permeability, which must otherwise be met by the sealing material alone, are now satisfied by two materials, the material of the seal and the material of the coating compound.

In connection with the manufacture of primary cells, it is known (e.g., DE-PS No. 1,937,605 and DE-PS No. 2,541,926) to provide selected areas of a thermoplastic sealing body with an elastic coating of bitumen, among others. However, such coatings are located exclusively in the sealing zone where they additionally adhere the sealing member to the housing cup or to the concentrically arranged bar electrode, thus perfecting the seal. This is to be distinguished from specifically covering the predetermined breaking point, in accordance with the present invention.

Figure 1:
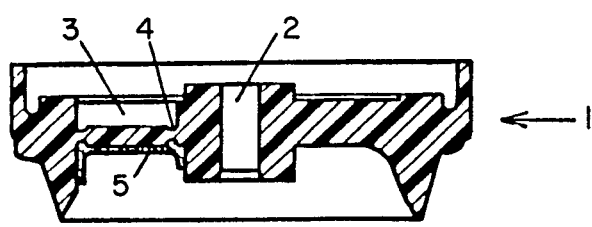
FIG. 1 is a cross-sectional view of a sealing member for a galvanic cell having the cover layer of the present invention.
Figure 2:
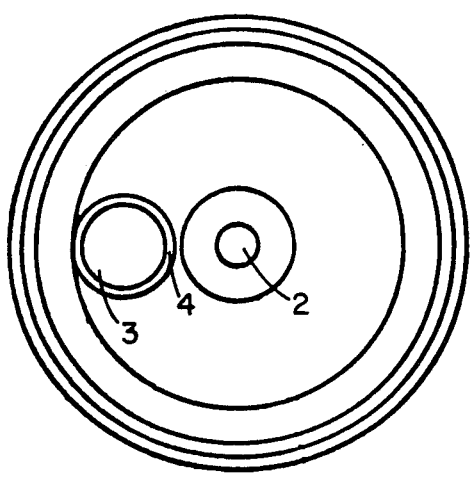
FIG. 2 is a bottom plan view of the sealing member.

FIGS. 1 and 2 show an example of a sealing member according to the present invention. The sealing member 1 selected for illustration in the drawings is used as the sealing member of a round cell, such as the LR 14 type (baby cell), and is preferably comprised of polyamide 66 (available under the trademark "Ultramid A3K" from BASF). The sealing member 1 is provided with a central opening 2 for passing the negative terminal (not shown) of the cell, and a disk-shaped bursting membrane 3 with a circular score 4. A film-like, pore-free cover layer 5 comprised of one of the materials previously identified as useful in accordance with the present invention (which can in most cases be applied from solutions in organic solvents) coats the bursting membrane 3 on the electrolyte-facing side of the sealing member 2, also covering immediate surroundings of the bursting membrane 3. Although the sealing member 2 selected for illustration in the drawings makes use of a scored bursting membrane, it is to be understood that the protective coating of the present invention would also equally apply to bursting membranes which do not have scored elements, as well.

The beneficial effect of the coating of the present invention on a sealing member was confirmed, at least in terms of the predetermined breaking point, as follows.

EXAMPLE

Type LR 14 round cells with polyamide seals were stored at 70° C.

A control series was prepared from cells with uncoated seals, as is conventional. Under the test conditions, 80% of the cells with uncoated seals burst after 28 days. The remaining cells contained so much gas that their internal pressure corresponded to about 6 bar. The bursting pressure for the seals from the cells which had not yet burst was between 10 and 40 bar.

A reference series prepared from the same batch as the control series, but having seals coated in accordance with the present invention, had no defective cells under the test conditions. These seals had been coated with a bitumen solution in the area of the bursting score. The volume of gas contained in these cells was comparable to that in the control series. The bursting pressure for the seals was 54 bar after the test storage.

For both series, the bursting pressure for the seals was about 60 bar in the fresh state. The coating causes no measurable changes under such conditions.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A galvanic cell having a negative zinc electrode, an alkaline electrolyte, and a housing sealed by a sealing member made from plastic and including a predetermined breaking point in the form of a bursting membrane or a score, wherein the sealing member is provided with an essentially pore-free, film-like cover layer which is resistant to the electrolyte at least in the area of the predetermined breaking point.

2. The galvanic cell of claim 1 wherein the cover layer is comprised of bitumen or paraffin.

3. The galvanic cell of claim 1 wherein the cover layer is comprised of a synthetic resin.

4. The galvanic cell of claim 3 wherein the synthetic resin is selected from the group consisting of vinyl compounds, polycarbonates, polystyrene and acrylonitrile.

5. The galvanic cell of claim 1 wherein the cover layer is comprised of an adhesive.

6. The galvanic cell of claim 5 wherein the adhesive is selected from the group consisting of fatty acid polyamides, polyisobutylene pressure-sensitive masses, cold-curing cyanoacrylates and melt-adhesives based on polyamides.

7. The galvanic cell of claim 1 wherein the coating is comprised of an alkali-resistant lacquer.

8. The galvanic cell of claim 1 wherein the sealing member is comprised of polyamide 66.

9. The galvanic cell of claim 1 wherein the coating covers the entire surface of the sealing member.

* * * * *